(12) United States Patent
Price et al.

(10) Patent No.: US 11,301,711 B2
(45) Date of Patent: Apr. 12, 2022

(54) SYSTEMS AND METHODS FOR ENHANCING REAL-TIME IMAGE RECOGNITION

(71) Applicant: Capital One Services, LLC, McLean, VA (US)

(72) Inventors: Micah Price, Plano, TX (US); Chi-san Ho, Allen, TX (US); Aamer Charania, Flower Mound, TX (US); Sunil Vasisht, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 36 days.

(21) Appl. No.: 16/871,916

(22) Filed: May 11, 2020

(65) Prior Publication Data

US 2020/0380285 A1 Dec. 3, 2020

Related U.S. Application Data

(63) Continuation of application No. 16/425,129, filed on May 29, 2019, now Pat. No. 10,650,265.

(51) Int. Cl.
| | |
|---|---|
| *G06K 9/36* | (2006.01) |
| *G06K 9/62* | (2006.01) |
| *G06T 11/00* | (2006.01) |
| *G06T 3/60* | (2006.01) |
| *G06T 5/00* | (2006.01) |

(52) U.S. Cl.
CPC .............. *G06K 9/36* (2013.01); *G06K 9/6262* (2013.01); *G06K 2209/23* (2013.01); *G06T 3/60* (2013.01); *G06T 5/007* (2013.01); *G06T 11/001* (2013.01)

(58) Field of Classification Search
CPC .... G06K 9/36; G06K 9/6262; G06K 2209/23; G06T 3/60; G06T 5/007; G06T 11/001
See application file for complete search history.

(56) References Cited

U.S. PATENT DOCUMENTS

| | | |
|---|---|---|
| 5,864,629 A | 1/1999 | Wustmann |
| 2017/0270375 A1 | 9/2017 | Grauer |
| 2018/0232587 A1* | 8/2018 | Wang ................. G06K 9/00771 |

* cited by examiner

*Primary Examiner* — David F Dunphy
(74) *Attorney, Agent, or Firm* — Finnegan, Henderson, Farabow, Garrett & Dunner, LLP

(57) ABSTRACT

Disclosed embodiments provide systems, methods, and computer-readable storage media for enhancing a vehicle identification with preprocessing. The system may comprise memory and processor devices to execute instructions for receiving an image depicting a vehicle. The image may be analyzed and first predicted identity and first confidence value may be determined. The first confidence value may be compared to a predetermined threshold. The processors may further select a processing technique for modifying the image and further analyze the modified image determining a second predicted identity of the vehicle. And a second confidence value may be determined. And the system may further compare the second confidence value to the predetermined threshold to select the first or second predicted identity for transmission to a user.

17 Claims, 7 Drawing Sheets

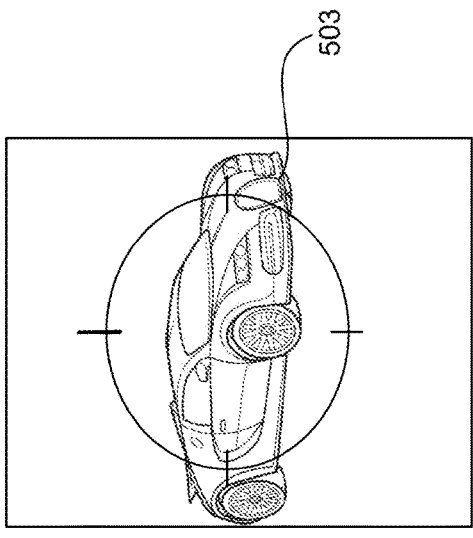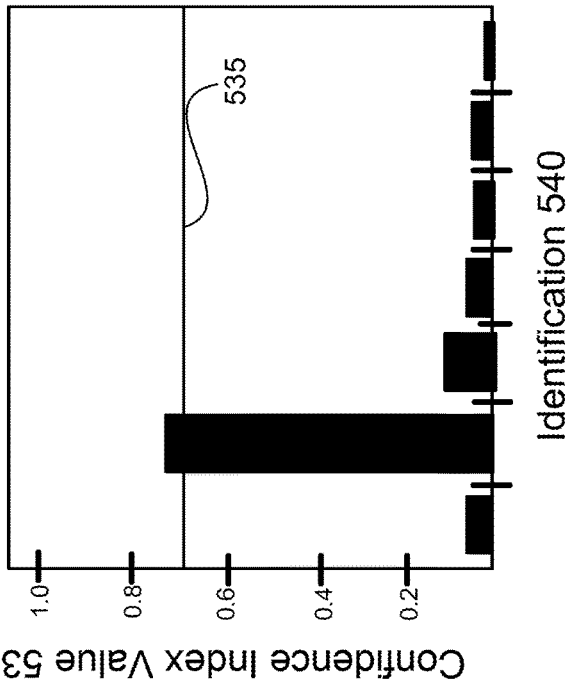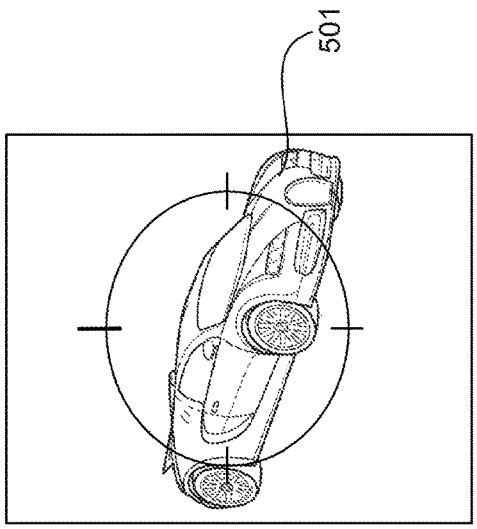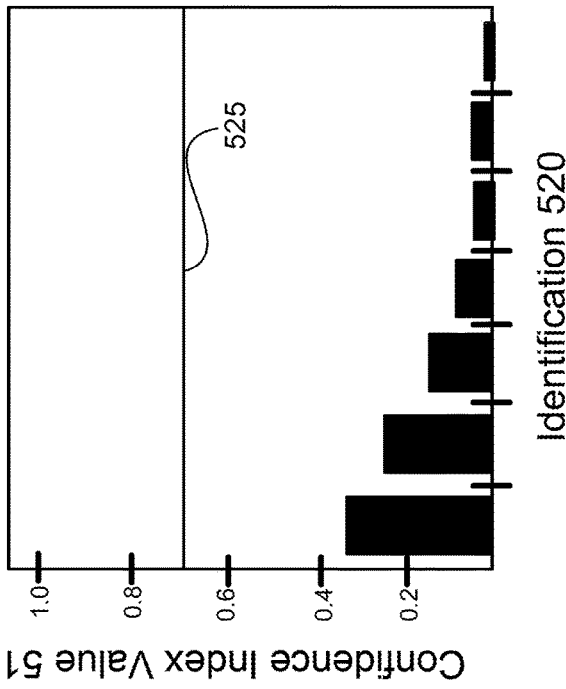
FIG. 5

SYSTEMS AND METHODS FOR ENHANCING REAL-TIME IMAGE RECOGNITION

CROSS-REFERENCE TO RELATED APPLICATIONS

This application is a continuation of U.S. patent application Ser. No. 16/425,129, filed May 29, 2019, and allowed Feb. 3, 2020 (now U.S. Pat. No. 10,650,265), the contents of which are expressly incorporated herein by reference.

TECHNICAL FIELD

The present disclosure relates generally to the field of image analysis using machine learning processes. More specifically, and without limitation, this disclosure relates to systems and methods for using machine learning processes to identify vehicles from images. More specifically, and without limitation, this disclosure relates to systems and methods for improving object recognition, such as image recognition, object detection, and image segmentation, by enhancing a vehicle identification model using a preprocessing augmentation tool that determines image attribute modifications based on historical data.

BACKGROUND

Extant image recognition systems, such as classifiers, cascading classifiers, neural networks, convolutional neural networks, or the like are used to receive an image of an object and determine the identity of the object. These systems may achieve high accuracy (e.g., comparable to humans) when the received image contains high-quality attribute and pixel data. However, the accuracy of extant systems is decreased when low-quality images are used. This is due, in part, to conflicting classifications when different objects (such as a vehicle and a person, a kitten and a ball, or the like) are present within the image, and more importantly, a recognition system is unable to determine the differences in objects because of the quality of image attribute data.

In particular, such systems, which often comprise neural networks or convolutional neural networks, may detect a plurality of objects within an image, recognize classes of objects within the image, and assign several potential identifications of the classes based on confidence scores. However, such processes often generate many (e.g., on the order of 1000 or more) identified classes, and a few adjustments to attributes of the image may significantly alter an identified class distribution of the process. The image recognition or object detection may be improved by "preprocessing" the images for identification, that is, using techniques to adjust and/or modify the image attributes prior to attempting identification. The identification model may spend time and resources running several variations of preprocessing iterations to determine an optimal resulting statistical identification confidence score (and the associated identified object).

Rote, untargeted preprocessing has several disadvantages, however. For one, preprocessing may alter object recognition values, and it is not clear at the outset which preprocessing will be the most important nor how that preprocessing will affect object recognition outcomes. As another example, preprocessing and iterations of image attribute modification consume processing resources and may contribute to an unreasonable delay in optimal object identification. These issues may be further compounded when an identification model is used in association with a smaller remote computing device such as a mobile device having limited resources. For instance, the identification model may be limited by the mobile device computing resources, and captured images may not be transmitted to a backend system for richer preprocessing. As yet another example, identification timing may be important for the mobile device user. Preprocessing on a mobile device may generally improve identification latency, for instance, but at the expense of accuracy (and/or vice versa for backend preprocessing). Thus, there is a need for intelligent identification through iterative preprocessing while balancing the requisite time and computing resources for determining the optimal identification.

One solution for improving image recognition or object identification is utilizing intentional, intelligent preprocessing techniques in association with historical data analysis to optimize identification results. By analyzing historical statistical identification confidence score distributions for several attribute modification iterations, with respect to a given image, the identification model may increase resulting confidence scores and improve object recognition while reducing resource consumption and identification latency. By intelligently preprocessing the images and modifying the image attributes, it may be possible to improve the identification model and optimize the resulting statistical identification confidences. The present disclosure thus provides systems, methods, and devices to further improve the accuracy of such object recognition processes by enhancing image recognition models with intelligent preprocessed modified images.

SUMMARY

In the following description, certain aspects and embodiments of the present disclosure will become evident. It should be understood that the disclosure, in its broadest sense, could be practiced without having one or more features of these aspects and embodiments. Specifically, it should also be understood that these aspects and embodiments are merely exemplary. Moreover, although disclosed embodiments are discussed in the context of a vehicle identification mobile application, the disclosed embodiments are not limited to any particular industry.

Disclosed embodiments provide systems, methods, and computer-readable storage media for enhancing a vehicle identification with preprocessing. The system may comprise memory and processor devices to execute instructions for receiving an image depicting a vehicle. The image may be analyzed and first predicted identity and first confidence value may be determined. The first confidence value may be compared to a predetermined threshold. The processors may further select a processing technique for modifying the image and further analyze the modified image determining a second predicted identity of the vehicle. And a second confidence value may be determined. And the system may further compare the second confidence value to the predetermined threshold to select the first or second predicted identity for transmission to a user.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 5 illustrates an exemplary embodiment for enhancing an identification model with preprocessing techniques.

DETAILED DESCRIPTION

Figure 1:
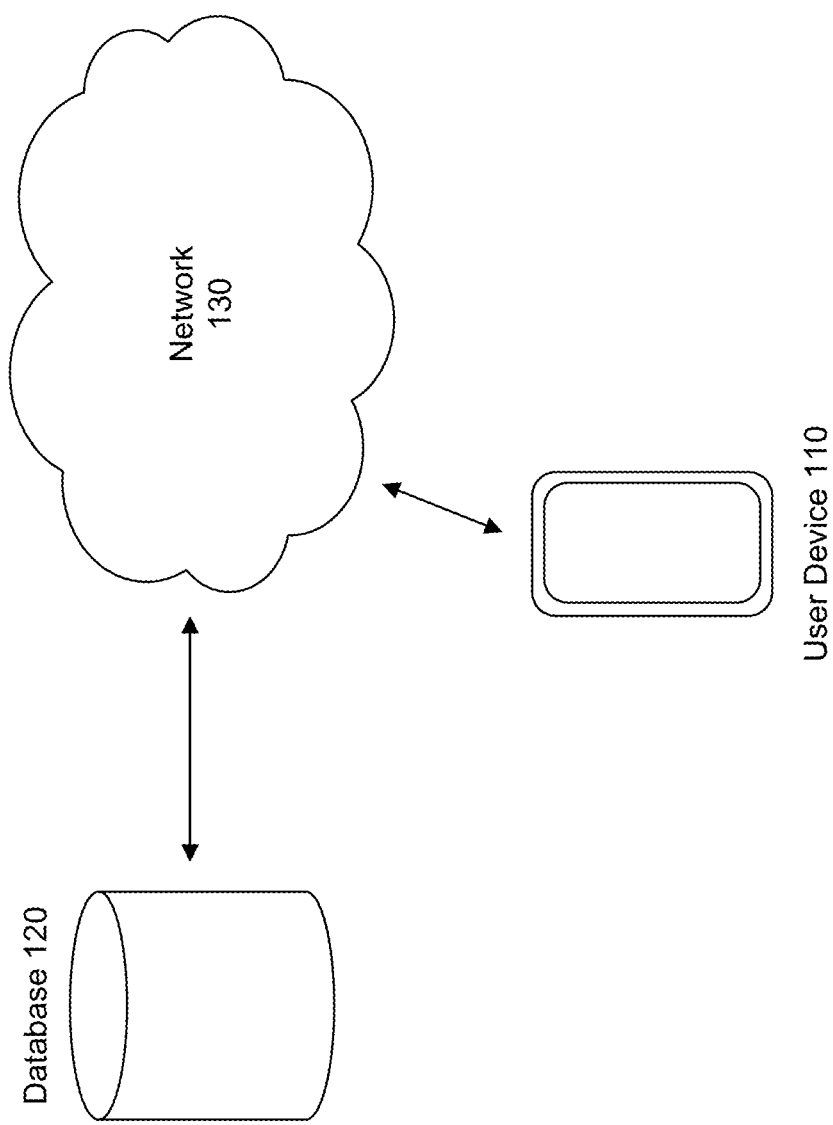
FIG. 1 is a block diagram illustrating an exemplary system for enhancing an identification model with preprocessing techniques.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence, nor constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

The disclosed embodiments relate to systems, devices, and methods for processing an image for computer vision tasks including image recognition, object detection, and image segmentation, in particular a vehicle identification model and methods for modifying images of the vehicle to improve the vehicle identification. Embodiments of the present disclosure may be implemented using at least one processor and at least one memory, as described below. In some embodiments, the at least one processor may comprise a microprocessor, such as a central processing unit (CPU), a graphics processing unit (GPU), or other electronic circuitry capable of carrying out the instructions of a computer program by performing the operations specified by the instructions. Alternatively or concurrently, the at least one processor may comprise one or more special-purpose devices built according to embodiments of the present disclosure using suitable circuit elements, e.g., one or more application-specific integrated circuits (ASICs), field-programmable gate arrays (FPGAs), or the like. In some embodiments, the at least one memory may comprise a volatile memory, such as random access memory (RAM), a non-volatile memory, such as a hard disk drive, a flash memory, or the like, or any combination thereof.

As used herein, the term "image" refers to any digital representation of a scene formed by one or more light beams. The image may comprise a plurality of pixels, each pixel having corresponding color and/or intensity data (e.g., RGB, CMYK, or grayscale data). The pixel data may be stored in any appropriate format, such as bitmap (BMP) format, Joint Photographic Experts Group (JPEG) format, Graphics Interchange Format (GIF), Tagged Image File Format (TIFF), a raw format, or the like. The at least one processor may receive the pixel data from a memory, e.g., via one or more buses, over a computer network, e.g., by using a network interface controller (NIC), from an image sensor, e.g. a charge-coupled device (CCD), a complementary metal-oxide-semiconductor (CMOS), an N-type metal-oxide-semiconductor logic (NMOS), or the like.

An image may further have associated "attributes." The attributes may be associated with an object itself or the attributes may be associated with the image. Image attributes may include inherent measurable features based on pixel data (e.g., RGB, CMYK, grayscale, brightness, contrast, histogram, noise reducing, etc.), and image attributes may also include recorded operations performed on the image (e.g., sectioning, layering, image scaling, cropping, cutting, orientating, perspective controlling, distorting, lens correcting, enhancing, sharpening and softening, merging, slicing, special effecting, stamping, gamma correcting, dynamic blending, warping, exposing, etc.). When the object is a vehicle, the object-attributes may be associated with a vehicle make, model, trim line, year, color, etc.

The at least one processor may be further configured to run an identification model by detecting and recognizing objects (e.g. vehicles, trees, cats, dogs, humans, etc.) in received images. For a given object (i.e. vehicle), the identification model may further recognize a subgroup of classes (e.g. Honda Civics, Toyota Camrys, etc.). In some aspects, identification models may include convolutional neural networks that detect objects and determine attributes in an image based on features extracted from the image. The convolutional neural network (CNN) may comprise object detection frameworks, for example, a You Only Look Once (YOLO) architecture, a Single-Shot Detector (SSD) architecture, or the like, as well as architectures designed for image recognition like Inception, VGG, ResNet, or the like.

In various aspects, identification models may include statistical processes to determine confidence scores. After training an identification model to certain objects (i.e. cats, dogs, or vehicle) with a set of training images, the model may output class identification conclusions based on assigned confidence scores. For example, after training to cats, the model may analyze a picture of a cat and determine three likely recognized classes based on image attribute analysis and determined confidence scores (i.e. 90% Siamese cat, 6% British Shorthair cat, or 4% Norwegian Forest cat). These statistical processes may further determine a similarity between images. For example, identification models may include regression models that estimate the relationships among input and output variables. In some aspects, identification models may additionally sort elements of a dataset using one or more classifiers to determine the probability of a specific outcome. Statistical identification models may be parametric, non-parametric, and/or semi-parametric models.

A convolutional neural network model can be configured to process an image into a collection of features. The convolutional neural network can comprise an input layer, one or more middle layers, and one or more output layers. An image can be applied to the input layer. In some embodiments, the input layer can comprise multiple matrices (e.g., a matrix for each of the red, green, and blue pixel values in an RGB image). In some embodiments, the input layer can comprise a single matrix (e.g., a single two-dimensional matrix of pixel brightness values). In some aspects, each middle layer and the output layer can be a deterministic function of the values of the preceding layer. The convolutional neural network can include one or more convolutional layers. Each convolutional layer can be configured to convolve one or more spatial filters with the convolutional layer input to generate a convolutional layer output tensor. Each spatial filter function can be defined by a matrix of weights to be applied to each element of the preceding layer during a convolution operation, an offset, and an activation function. Training the convolutional neural network can comprise modifying the weights and offsets using a backpropagation algorithm. In some embodiments, the convolutional neural network can also include pooling layers and fully connected layers according to methods known in the art.

Identification models may also include Random Forests, composed of a combination of decision tree predictors. Such decision trees may comprise a data structure mapping observations about something, in the "branch" of the tree, to conclusions about that thing's target value, in the "leaves" of the tree. Each tree may depend on the values of a random vector sampled independently and with the same distribution for all trees in the forest. Identification models may additionally or alternatively include classification and regression trees, or other types of models known to those skilled in the art.

Additionally, or alternatively, the identification model may detect a plurality of objects, polygons, or other image segmentation within a received image. The identification model may calculate a class confidence score for an object based on a classification and a confidence associated with the object. The identification model may further identify the object by comparing the confidence score against other calculated confidence scores and other data stored in databases.

The identification models may also be stress-tested to determine the limits of the outputted statistical confidence scores. To stress-test an identification model, both image and vehicle attributes may be adjusted to determine the effects of modifications to isolated attributes on the resulting identification confidence scores. For instance, the effect of vehicle attributes may be stress-tested for a series of images of the same vehicle make, model, trim line, and year, but with various colors. The resulting distribution of confidence scores may change based on the various colors tested. Similarly, the effect of image attributes may be stress-tested for a single image of a vehicle, by modifying a single image attribute, i.e. rotation, and determining the resulting confidence scores for the series of rotation modified images.

The identification model may also have access to a database to store the values, analysis, confidences, outputs, stress-test determinations, etc., as well as, to pull input data from.

The at least one processor may be further configured to run an augmented reality framework, such as Apple's ARKit or Android's ARCore, or a machine learning framework, such as Apple's CoreML or Android's Tensorflow.

Systems and methods consistent with the present disclosure are directed to enhancing a vehicle identification with preprocessing. The system may comprise memory and processor devices to execute instructions to perform operations including receiving an image depicting a vehicle. The image may be analyzed and first predicted identity and first confidence values may be determined. The first confidence value may be compared to a predetermined threshold. The processors may further select a processing technique for modifying the image and further analyze the modified image determining a second predicted identity of the vehicle. A second confidence value may be determined, and the system may further compare the second confidence value to the predetermined threshold to select the first or second predicted identity for transmission to a user. In some embodiments, the first and second confidence values may be identical and the user is notified of both values. Alternatively, the system may determine that a processing technique failed when the first or second confidence value is not within the predetermined threshold. Thus, the system may attempt another processing technique resulting in a third confidence value, notify the user of identification failure, and/or conduct any other process consistent with the disclosed embodiments.

FIG. 1 is a block diagram illustrating an exemplary system 100 for enhancing real-time image recognition of an identification model. System 100 may be used to identify a vehicle, and associated vehicle attributes (e.g., make, vehicle model, trim line, year, color, etc.) based on an image of the vehicle and associated image attributes (e.g., RGB, CMYK, grayscale, brightness, contrast, focus, rotation, etc.), consistent with disclosed embodiments. System 100 may be further used to modify the image attributes to improve the vehicle identification. System 100 may include a user device 110, a database 120, and a network 130. In some embodiments, as shown in FIG. 1, each component of system 100 may be connected to a network 130. However, in other embodiments components of system 100 may be connected directly with each other, without network 130.

User device 110 may include one or more computing devices configured to perform operations consistent with disclosed embodiments. For example, user device 110 may include at least one of a desktop computer, a laptop, a server, a mobile device (e.g., tablet, smart phone, etc.), a gaming device, a wearable computing device, or other type of computing device. User device 110 may include one or more processors configured to execute software stored as instructions in memory. User device 110 may implement software to perform Internet-related communication and content display processes. For instance, user device 110 may execute browser software that generates and displays interfaces, including content, on a display device included in, or connected to, user device 110. User device 110 may execute applications that allow user device 110 to communicate with components over network 130, and generate and display content in interfaces via a display device included in user device 110. The disclosed embodiments are not limited to any particular configuration of user device 110. For instance, user device 110 can be a mobile device that stores and executes mobile applications that interact with database 120 and network 130 to perform aspects of the disclosed embodiments, such as identifying vehicles. In certain embodiments, user device 110 may be configured to execute software instructions relating to location services, such as GPS locations. For example, user device 110 may be configured to determine a geographic location and provide location data and time stamp data corresponding to the location data. In yet other embodiments, user device 110 may capture video and/or images.

Database 120 may include one or more computing devices configured to provide data to one or more of user device 110 or network 130. In some aspects, such data can include vehicle inventory listings, vehicle images, and vehicle features. Alternatively, in alternative embodiments, such data may include past vehicle identification model values, analysis, confidences, outputs, stress-test determinations. Database 120 may include, for example, one or more Oracle™ databases, Sybase™ databases, or other relational databases or non-relational databases, such as Hadoop™ sequence files, HBase™, or Cassandra™. Database(s) 140 may include computing components (e.g., database management system, database server, etc.) configured to receive and process requests for data stored in memory devices of the database(s) and to provide data from the database(s). While database 120 is shown separately, in some embodiments database 120 may be included in or otherwise related to one or more of user device 110 and/or network 130.

Network 130 may be any type of network configured to provide communications between components of system 100. For example, network 130 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In some embodiments, one or more components of system 100 can communicate through network 130. In various embodiments, one or more components of system 100 may communicate directly through one or more dedicated communication links.

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
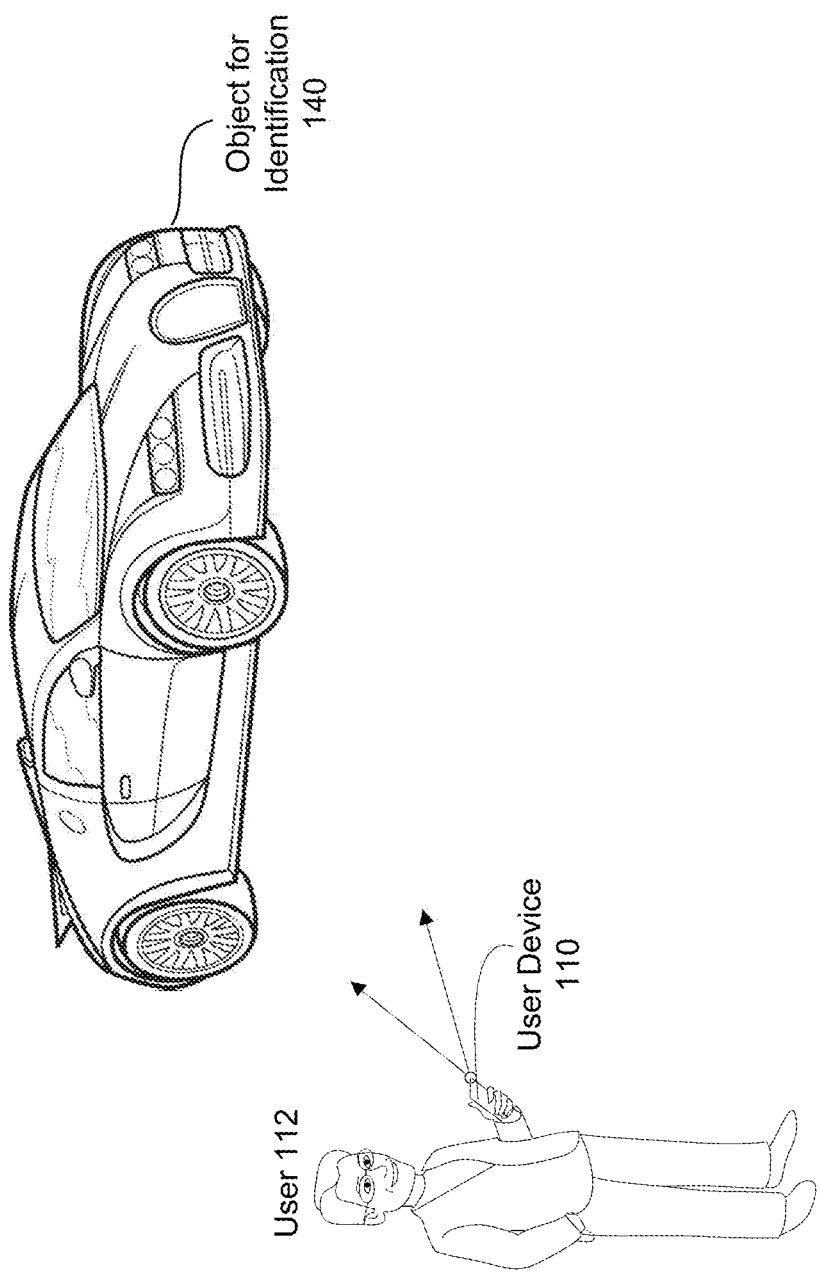
FIG. 2 is a diagram illustrating use of the system of FIG. 1, consistent with the disclosed embodiments.

FIG. 2 shows an environment 200 illustrating use of system 100 consistent with the disclosed embodiments. User device 110 is consistent with the functions and properties described throughout FIG. 1. A user 112 is an individual, or group of individuals, who utilize the identification model application that performs the functions described herein for identifying objects (e.g., vehicles) based on captured or received images. The user 112 may be associated with the identification model application design, or the user 112 may be associated with a third-party designer. Alternatively, the user 112 may be a customer of the identification model application. Further, in some embodiments user 112 may use user device 110, installed with an identification model application, to modify and adjust the captured or received images to enhance the identification model application consistent with the methods described herein, and in particular FIGS. 5-6.

In some embodiments, user 112 may utilize user device 110, installed with an identification model application, to identify an object of interest 140. In some embodiments, user 112 may have a version of an identification model application, such that user 112 is unable to modify the model itself. In other embodiments, user 112 may have a version of an identification model application such that user 112 may modify, or cause modification of, the model on user device 110.

Object 140 is an object to be identified and recognized by an identification model application. User 112 may utilize user device 110 to capture images of object 140 and feed those images to the identification model application through the means described herein. The identification model may assign confidence index values to potential objects, and conclude or predict the identity of object 140 based on the highest assigned confidence index value (see FIG. 5 for an exemplary embodiment). In some embodiments, object 140 may be a vehicle, such as an automobile, vehicle, motorcycle, moped, bicycle, tricycle, etc., or alternatively, object 140 may be any object such as a tree, a building, or an animal.

Figure 3:
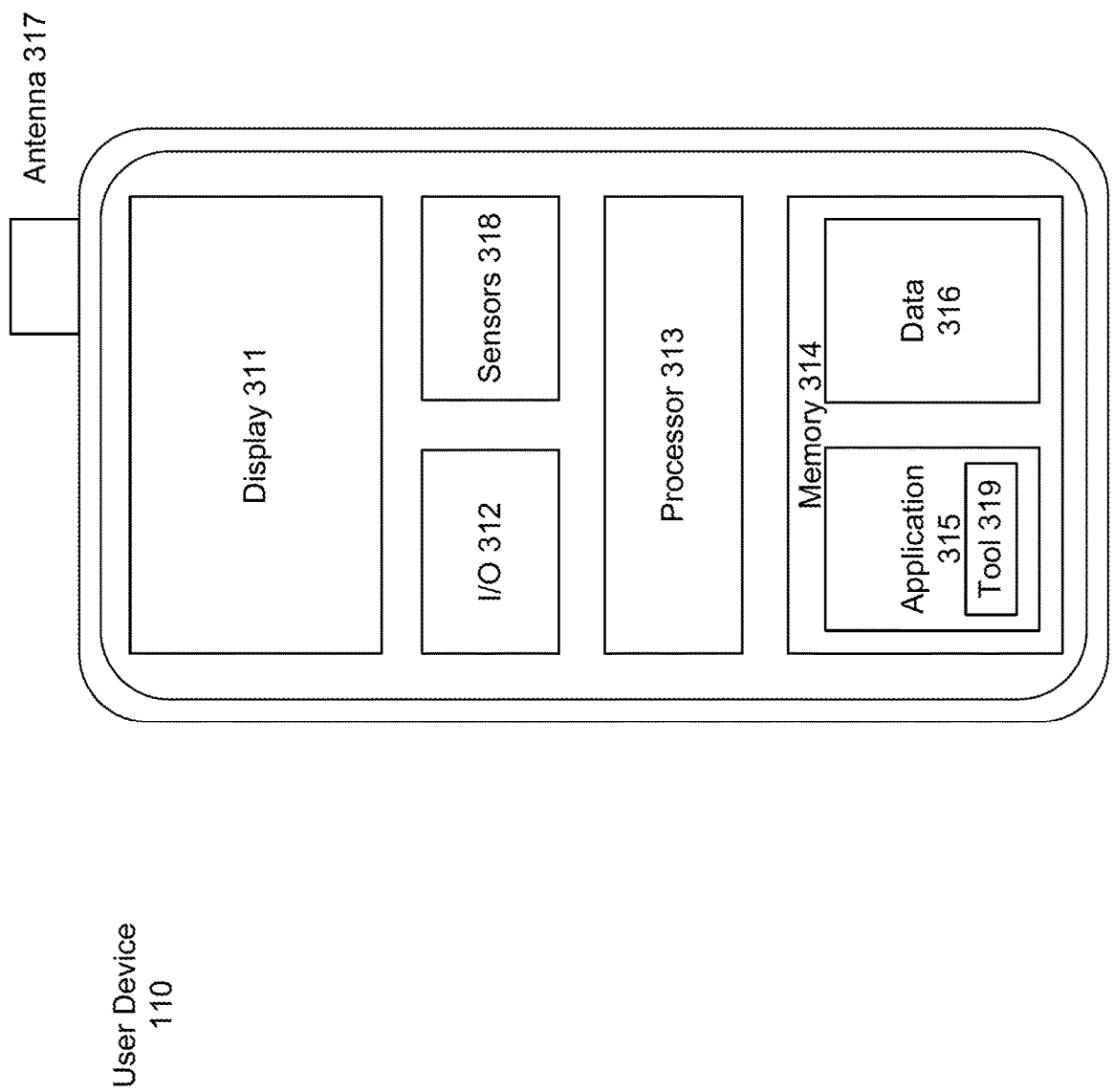
FIG. 3 is a block diagram an exemplary user device, consistent with disclosed embodiments.

FIG. 3 illustrates an exemplary configuration of user device 110, consistent with disclosed embodiments. User device 110 may be implemented in system 100 as various devices, such as a cell phone, a tablet, a mobile computer, a desktop, etc. As shown, user device 110 includes a display 311, one or more input/output ("I/O") components 312, one or more processors 313, and a memory 314 having stored therein one or more program applications 315, such as an identification model application, and data 316. User device 110 also includes an antenna 317 and one or more sensors 318.

Processor 313 may be one or more known processing devices, such as a microprocessor from the Pentium™ or Atom™ families manufactured by Intel™, the Turion™ family manufactured by AMD™, the Exynos™ family manufactured by Samsung™, or the Snapdragon™ family manufactured by Qualcomm™. Processor 313 may constitute a single-core or multiple-core processors that execute parallel processes simultaneously. For example, processor 313 may be a single-core processor configured with virtual processing technologies. In certain embodiments, processor 313 may use logical processors to simultaneously execute and control multiple processes. Processor 313 may implement virtual machine technologies, or other known technologies to provide the ability to execute, control, run, manipulate, store, etc., multiple software processes, applications, programs, etc. In another embodiment, processor 313 may include a multiple-core processor arrangement (e.g., dual, quad core, etc.) configured to provide parallel processing functionalities to allow user device 110 to execute multiple processes simultaneously. One of ordinary skill in the art would understand that other types of processor arrangements could be employed that provide for the capabilities disclosed herein.

I/O devices 312 may include one or more I/O components 312 that allow user device 110 to receive input from a user and provide feedback to the user. I/O components 312 may include components such as, for example, buttons, switches, speakers, microphones, cameras, styluses, or touchscreen panels.

Memory 314 may be a volatile or non-volatile, magnetic, semiconductor, tape, optical, removable, non-removable, or other type of storage device or tangible (i.e., non-transitory) computer-readable medium that stores one or more program applications 315 and data 316. Data 316 may include, for example, display settings and preferences, vehicle attributes (e.g., make, vehicle model, trim, year, color, etc.), and image attributes (e.g., RGB, CMYK, grayscale, brightness, contrast, focus, rotation, etc.).

Program applications 315 may include operating systems that perform known operating system functions when executed by one or more processors. By way of example, the operating systems may include Microsoft Windows™, Unix™, Linux™, Apple™, or Android™ operating systems, Personal Digital Assistant (FDA) type operating systems, such as Microsoft CE™, or other types of operating systems. Accordingly, disclosed embodiments may operate and function with computer systems running any type of operating system. User device 110 may also include communication software that, when executed by processor 313, provides communications with network 130, such as Web browser software, tablet, or smart hand held device networking software, etc.

Program application 315 may include an application executing an identification model that performs the functions described herein for identifying vehicles based on captured/received images. The identification model recognizes features in received images portraying an object and utilizes statistical analysis to determine an accurate identification of the object through assignment of confidence index values. The identification model may determine the object is likely to be a set of objects within a larger group such that multiple objects are assigned confidence index values. And the identification model may conclude a likely identity of an object based on the highest assigned confidence index value. The recognized features may be object attributes, and the image attributes may affect the accuracy and confidence index value determinations. In some embodiments, a user may compare the highest assigned confidence value or a confidence value distribution of a received image against known confidence value and distribution data in local memory or a remote database. The identification model application may incorporate several of the computation and convolutional computing processes discussed throughout here. In some embodiments, program application 315 may include an enhancement and preprocessing application, such as augmentation tool 319, that performs the functions described in FIGS. 5-6.

Figure 6:
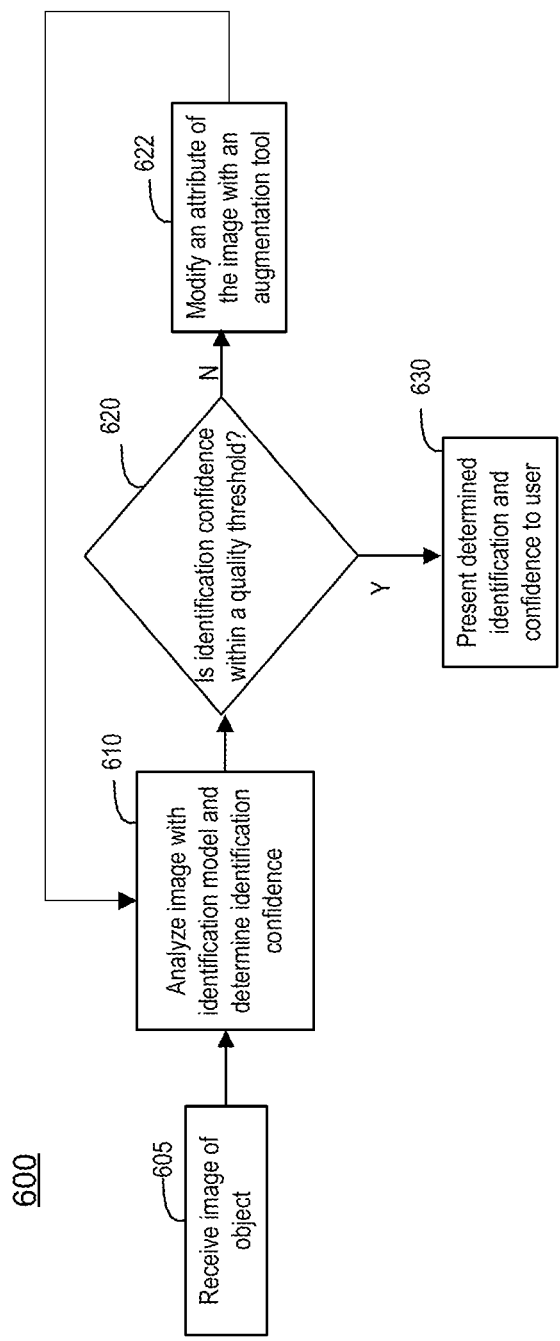
FIG. 6 is a flowchart of an exemplary method for enhancing an identification model with preprocessing techniques.

User device 110 may also store in memory 314 data 316 relevant to the examples described herein for system 100, such as images provided to user device 110 for the preprocessing application described in FIGS. 5-6. Data 316 may contain any data discussed above relating to the identification of objects in the received images. Data 316 may be further associated with information for a particular user or particular user device.

Sensors 318 may include one or more components capable of sensing the environment around user device 110, and/or movement of user device 110, as well as data gathered by input/output 312. In some embodiments, sensors 318 may include, for example, an accelerometer, a shock sensor, a gyroscope, a position sensor, a microphone, a camera, an ambient light sensor, a temperature sensor, and/or a conductivity sensor. In addition, sensors 318 may include location-detecting components such as a Global Positioning System (GPS) sensor, a radio frequency triangulation system based on cellular or other such wireless communication, and/or other systems for determining the location of accessing device 110.

Antenna 317 may include one or more components capable of communicating with network 130. Examples include an antenna wirelessly communicating with network 130 via cellular or Wi-Fi protocols. Although communication between user device 110 and network 130 is shown as wireless communication, communication could also occur using wired communication via, for example, an Ethernet terminal (not shown).

In certain embodiments, device 110 may include a power supply, such as a battery (not shown), configured to provide electrical power to user device 110.

Figure 4:
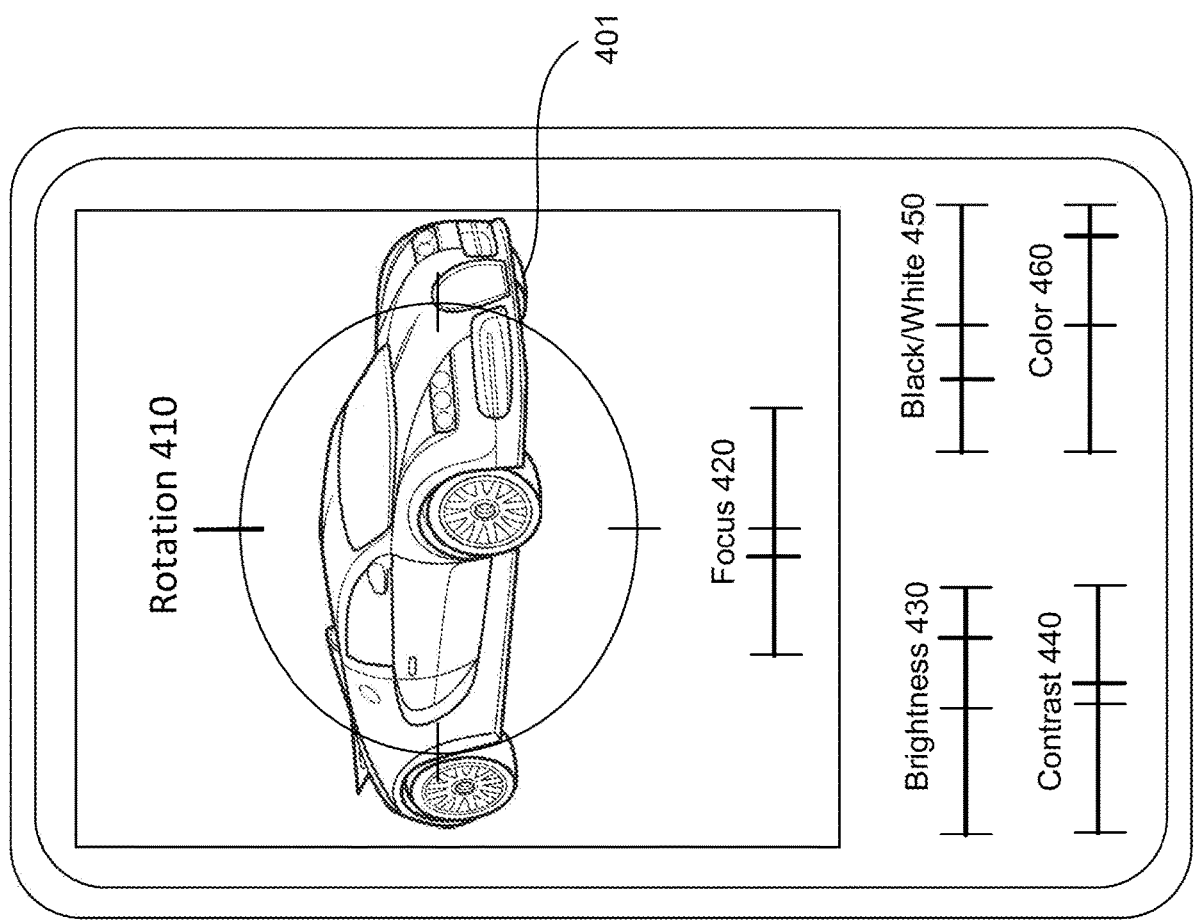
FIG. 4 illustrates an interface of an identification model application, consistent with disclosed embodiments.

FIG. 4 illustrates an interface of an exemplary identification model application 400. As discussed above, in some embodiments, identification model application 400 may include convolutional neural networks that analyze received images to detect objects and determine attributes in an image based on features and attributes extracted from the image. The CNN may comprise, for example, a You Only Look Once (YOLO) architecture, a Single-Shot Detector (SSD) architecture, or the like, as well as, architectures designed for image recognition like Inception, VGG, ResNet, or the like. The analyzed image may comprise a plurality of pixels, each pixel having corresponding image quality data attributes (e.g., rotation, focus, brightness/contrast color, RGB, CMYK, grayscale, etc. data). Additionally the image may contain data not corresponding to image quality, such as location data, time of photo capture data, capturing device data, and cropped data from the image.

In some embodiments, identification model application 400 may receive an image 401 of an object to be identified. Image 401 may be captured from various devices discussed herein such as user device 110. Alternatively, in some embodiments image 401 may be stored in a database such as database 120. Image 401 may be transmitted, from user device 110, database 120, etc. to another device that runs identification model application 400 such as a second user device 110 consistent with the features described in FIG. 3. Alternatively, identification model 400 may further limit the features discussed herein such that user device 110 is enabled with all features, such as the ability to modify identification model application 400.

Identification model application 400 analyzes received images portraying objects (e.g., vehicles) and recognizes features in the received images. Identification model application 400 analyzes the recognized features to accurately identify the object by assigning confidence index values to a set of potential objects. The identification model 400 concludes the identity of the object based on the recognized features, which may be object attributes, and confidence index value statistical analysis.

Image 401 may exhibit image attributes such as rotation angle 410, focus 420, brightness 430, contrast 440, black/white (saturation) 450, and color 460, as well as, other attribute data described herein. For instance, one skilled in the art will understand that while FIG. 4 depicts several image attributes, image 401 may exhibit other attributes that may have measurable or recorded modifications such as sections, layers, image scale, cropping, cutting, histogram, noise reduction, orientation, perspective control, distortion, lens correction, enhancement, sharpening and softening, merging, slicing, special effects, stamps, gamma correction, dynamic blending, warping, exposure time, etc. Additionally, identification model application 400 may adjust the attributes of received image 401, to improve and enhance the accuracy of identification model (as discussed in FIGS. 5-6).

Image rotation attribute 410 pertains to an angular orientation of image 401, but one skilled in the art would appreciate that attributes of various other coordinates may be used to describe the orientation of image 401. Also, in some embodiments, rotation 410 may be adjusted with identification model application 400. For instance, image 401 may be adjusted so the orientation is rotated by 10° relative to horizontal, or "flipped" by adjusting rotation 410 by 180°.

Image focus attribute 420 describes image data pertaining to capturing of the image by a lens. For instance, various portions of image 401 may be in focus, while other portions are not. Focus attribute 420 may be adjusted to add clarity to image 401.

Image brightness attribute 430 pertains to pixel data reflecting the luminance of portions of image 401. For instance, images may be improved by adjusting brightness 430 to increase luminance of underexposed portions of image thereby brightening under-exposed shadows without affecting the rest of image 401.

Image contrast attribute 440 pertains to the difference between dark and bright pixels of image 401. Adjustment of brightness 430 adjusts the overall luminance level of image 401, whereas adjustment of contrast 440 adjusts the difference in luminance between various portions of image 401. Increasing brightness 430 will increase the luminance value every pixel in portions of image 401 brighter, while increasing contrast 440 makes the luminance of bright pixels higher and the luminance of dark pixels lower.

Image black/white attribute 450 pertains to adjusting the color intensity, or saturation, level of pixels of image 401, whereas, image color attribute 460 pertains to the hue of pixels of image 401. Adjusting black/white 450 and color 460 may adjust every pixel data of image 401.

As discussed herein, user 112 may use identification model application 400 to adjust the image attributes of image 401. By modifying one or more of each attribute 410-460, user 112 may modify image 401 and create a modified image for identification analysis. Alternatively, in some embodiments, identification model application 400 may automatically adjust the image attributes of image 401 by modifying one or more of each attribute 410-460. The identification model application 400 may further compare resulting identification analyses, based on the resulting image with any one or more of the modified attributes 410-460, as well as resulting distribution of confidence values with respect to the modified attributes.

FIG. 5 shows an exemplary embodiment of system 100 enhancing the identification model by preprocessing an image. FIG. 5 further shows images 501 and 503, and associated bar graphs with potential identified objects along the x-axis 520 and 540 respectively and associated determined confidence index values along the y-axis 510 and 530 respectively. Image 501 may be a pre-processed image for identification and as-is received by user device 110, whereas, image 503 may be a post-processed image with means discussed in FIG. 4 by augmentation tool 319. Each vertical bar represents the statistical confidence index value determination, as discussed herein, that the associated object (e.g., vehicle) is the correct object in the received image. Other than the depicted rotation attribute modification of 10°, images 501 and 503 may be the same. In some embodiments, the confidence index values may total 1.0. Additionally, in some embodiments, the potential identified objects may be significantly more than the shown seven or less than seven. Nevertheless, the first vertical bar in the graph defined by axes 510 and 520 is associated with the same object as the first vertical bar in the graph defined by axes 530 and 540, and so on, with the remaining vertical bars, respectively. Additionally, lines 525 and 535 represent a predetermined quality threshold, depicted as 70%.

As depicted, image 501 has no modification to the rotation of received image. In FIG. 5, the identification model application may determine that the first vehicle identification 520 (the first vertical bar), is the highest identification with a confidence index value 510 of 0.35, the second vertical bar with a confidence index value of 0.30, the third vertical bar with a confidence index value of 0.15, and the fourth vertical bar with a confidence index value of 0.10. The fifth, sixth, and seventh vertical bars associated with the fifth, sixth, and seventh vehicle identification 520 total a confidence index value 510 of 0.1 and are nearly undistinguishable. System 100 may further determine that none of the assigned confidence index values exceed the predetermined quality threshold 525.

In some embodiments, system 100 may proceed with modifying received image 501 with augmentation tool 319 resulting in image 503. Image 503 has a slight rotation modification of 10°. As discussed herein, system 100 may process received image 501 with augmentation tool 319 resulting in image 503. The identification model application may analyze modified image 503 and determine that the first vehicle identification 540 (the first vertical bar), is no longer the highest identification with a confidence index value 530 of 0.05, the second vertical bar now is the highest identification with a value of 0.75, and the third vertical bar with a value of 0.15. The remaining vehicle identifications 540 are undistinguishable. Additionally, system 100 may further determine that the second confidence index value 530 exceeds the quality threshold 535.

In some embodiments, system 100 may adjust the predetermined quality threshold 525 or 535 after analysis of the resulting identification 520 or 540 confidence index value distribution. In certain embodiments, for instance, different objects may be associated with one or more quality thresholds 525 or 535 such that system 100 may alter the quality threshold 525 or 535 based on the identified object. Additionally or alternatively, system 100 may change the quality threshold 525 or 535 based on an analysis of the confidence distribution. For example, system 100 may determine whether the difference between the highest confidence index value and second-highest confidence index value exceeds a critical difference threshold and/or whether the distribution has a standard deviation lower than some other critical difference threshold (e.g., the distribution is narrow). In response, system 100 may change the predetermined quality threshold 525 and 535 based on this determination. By way of a nonlimiting numerical example, system 100 may proceed with modifying received image 501 with augmentation tool 319 producing an image like 503, yet with no resulting confidence index value 540 greater than the quality threshold 535. In this example, the highest vertical bar may only have a 0.69 confidence value, none of the remaining confidence index values exceed 0.2, and the system may impose a critical difference threshold of 0.45. Because the difference between the highest confidence index value (0.69) and the next highest confidence index value (at most 0.2) is greater than the critical difference value (0.69−0.20=0.49>0.45), system 100 may decrease the requisite predetermined quality threshold 535 (e.g., from 0.70 to 0.65) such that the confidence index value of 0.69 exceeds the threshold 535.

In certain aspects, the critical difference thresholds and quality thresholds described herein may be predetermined and/or may change dynamically in response to other determinations consistent with the disclosed embodiments. For example, system 100 may dynamically update the critical difference threshold based on whether the confidence index value distribution is similar to other distributions (e.g., based on historical, current, and/or later-computed confidence distributions, any of all of which may be stored in a database and/or associated with a particular user, mobile device, etc.), based on the object identified, based on a user or a mobile device identifier, etc. In some aspects, for instance, different objects may be associated with set of critical difference thresholds and/or quality thresholds.

Similarly, system 100 may conduct processing when the confidence index value distribution is wide (e.g., the difference between the highest confidence value and second-highest confidence index value falls below a critical difference threshold and/or the distribution has a standard deviation higher than another such critical distribution threshold). In one example, system 100 may increase the predetermined quality threshold based on a determination that the difference between the first-highest and second-highest confidence index values is less than a critical difference threshold (and/or when the standard deviation for the distribution exceeds another such threshold, etc.).

In some embodiments, system 100 may determine whether the identification 520 or 540 distribution is similar to one or more previous distributions for similar preprocessing attribute modifications and undertake additional processing consistent with the disclosed embodiments. For example, system 100 may lower the quality threshold or alter a critical difference threshold when it determines that two confidence distributions are similar. Alternatively, system 100 may determine whether the object being identified is similar to previous objects based on similar confidence value distributions, and in response system 100 may alter the quality threshold based on the similar confidence value distributions. System 100 may determine whether two distributions are similar by, for example, determining whether a sum of the absolute differences among the distributions falls below a given threshold, determining whether the sum of the squares of differences falls below a given threshold, comparing statistical measures of the two distributions (e.g., mean, median, standard deviation, variance, etc.), determining that the two distributions produced identify the same object with the highest and/or second-highest confidence index values, etc. System 100 may further rely on past or historic confidence index value distributions stored in a database such as memory 314, to make such comparisons. In some aspects, historical confidence index value distribution data may be based on global data (e.g., based on a predetermined or dynamically-updated learning set) and/or may be based on historical results generated for a particular user, mobile device, set of images, and/or over a set of given time periods, etc.

FIG. 6 is a flowchart of an exemplary method 500 for system 100 to enhance the identification model by preprocessing an image. At step 605, system 100 receives an image of objects of the type that the system will use to identify the object. As discussed herein, system 100 may receive this from user device 110, and/or database 120, for example, via network 130. The received image may have associated image attributes discussed in FIG. 4 as well as non-image attribute data such as object attribute data discussed above. Further, the received image may have data associated with the device capturing the image (e.g., camera type, lens type, device location, etc.). The received image attribute data may be in the form of pixel data. The image may be high quality such that the user 112 understand the received image accurately represent objects for identification.

At step 610, system 100 analyzes the received image with an identification model. That is, system 100 determines an initial identification confidence value, by recognizing features in received image portraying an object, and utilizing statistical analysis to determine an initial identification of the object through assignment of confidence index values. System 100 concludes the identity, the predicted identity, of an object based on the highest assigned confidence index value. The identification model may be any model discussed herein to identify objects in received images. In some embodiments, identification model may be used to identify vehicles as discussed in FIG. 4. Additionally, the identification model may identify the object in the received image and determine an initial confidence in that identification in accordance with the modeling and statistical analysis described above.

At step 620, system 100 further determines whether the initial confidence of the predicted identity (i.e. first predicted identity) is above a predetermined quality threshold or within a predetermined quality threshold range. For instance, system 100 may determine whether the initial confidence of the predicted identity is above the predetermined quality threshold by comparing the confidence index value for each potential identified object to the threshold. Alternatively, system 100 may determine the initial confidence of the predicted identity is within the quality threshold range by comparing the confidence index value of the associated first predicted identity to a range of predetermined quality threshold values. The predetermined quality threshold (or threshold range) may be set by user 112, a third-party developer, and/or by system 100. User 112 or the third-party developer may set the predetermined quality threshold based on analysis of the model prediction performance and historical confidence distribution data stored in a database, such as database 120 or memory 314. The stored historical data may contain data specific to the particular user 112 and associated user device 110 or data for a plurality of users and user devices. In some embodiments, the predetermined quality threshold may be used to conclude identification if the associated confidence index value of the first predicted identity is within the threshold range. Whereas, system 100 in some embodiments may conclude an inaccurate identification or insufficiently confident identification if the associated confidence index value of the first predicted identity is below the threshold (or outside the threshold range).

At step 622, when the first identification confidence is below the quality threshold (or outside the threshold range), system 100 may modify an attribute of the image with a preprocessing augmentation tool. System 100 may modify an attribute of the received image by means discussed in FIG. 4. In some embodiments, system 100 may modify the received image numerous times, or alternatively, system 100 may modify several attributes once or numerous times by means discussed.

Additionally, in some embodiments, preprocessing augmentation tool 319 may select the attribute(s) for modification based on a model, random selection, or specific selection. Preprocessing augmentation tool 319 may include an optimizer model that selectively determines attribute(s) for modification based on confidence indexes and statistical distributions associated with historical analysis data stored in storage devices such as database 120 or memory 314 (i.e. historical modification data). Alternatively, in some embodiments, preprocessing augmentation tool 319 may include a machine learning model that selectively determines attribute (s) for modification based on received historical modification data. Preprocessing augmentation tool 319 may include any other such modelling technique described herein to selectively determine received image attribute(s) for modification.

For instance, preprocessing augmentation tool 319 may further recognize effects on the identification confidences, or distribution of identification confidences, for historical modification data and associate the resulting identification confidence distributions with that given image attribute modification. For a given image, preprocessing augmentation tool 319 may determine one or more environmental cues associated with an image and make image attribute modifications accordingly. For example, preprocessing augmentation tool 319 may recognize that the image was captured in a low-brightness (e.g. low-light) setting based solely on the resulting identification confidence distributions. Such environmental cues may be based on lighting (e.g., low-light, high-light), contrast, sharpness, color saturation, image location information (e.g., determined from an associated mobile device capturing the image, metadata associated with the image, etc.), time of day, and the like. Such processing may be advantageous where user 112 only has access to the resulting identification confidence distributions but does not have access to the original identified images from associated historical modification data. For example, user 112 may be associated with the identification model designer (i.e. the model "backend") and the user 112 may only have access to historical modification data and the resulting identification confidence distributions, but may not have access to the original images taken by a different user such as a customer. In this example embodiment, preprocessing augmentation tool 319 may further use the historical modification data to further recognize effects in the identification confidences. Additionally, user 112 may use the resulting identification confidence distributions to improve the identification model version embedded on user device 110. In some embodiments, user 112 may use the resulting identification confidence distributions to improve the preprocessing augmentation tool 319, or user 112 may improve the quality threshold values. The identification model, in association with preprocessing augmentation tool 319, may further use historical identification confidence distributions to recognize a low-quality image attribute, such as low-brightness, modify that image attribute, and recalculate the identification confidence after step 622. This low-light attribute may be recognized across several historical images, such that it may be further incorporated into the preprocessing augmentation tool by increasing brightness by 20% for all images, for example.

Alternatively, in some embodiments, preprocessing augmentation tool 319 may, after analyzing historical inputs received from database 120 or user device 110, recognize that certain modifications significantly alter the identification confidence, as noted by a significant difference between stored initial identification confidences and new modified confidences associated with previous modifications. To make such modifications, the preprocessing augmentation tool 319 may analyze data from historical inputs stored in database 120 or user device 110 collected from backend users 112 or customers 112. As described herein, such historical data may reflect global data (e.g., preset or dynamically-updated data aggregated from a learning set and/or usage data), and/or may incorporate data specific to a given user, mobile device, location, time of day, etc. Preprocessing augmentation tool 319 may use this information to create respective quality control parameters that further dictate which image attributes are affected by respective attribute modification, and how significantly.

In some embodiments, preprocessing augmentation tool 319 may determine one or more attributes for modification in real-time, within a time window, or continuously. For instance, in some embodiments, preprocessing augmentation tool 319 may utilize several models described herein to determine the optimal attribute(s) for modification and the optimal analysis may improve or change over time. Preprocessing augmentation tool 319 may continuously process attribute options or it may determine attribute(s) for modification after a set time window.

After preprocessing augmentation tool 319 modifies one or more attributes of the received image, system 100 may repeat step 610 with the modified image and determine a second identification confidence value (or distribution of values), by recognizing features in the modified image portraying an object, and utilizing statistical analysis to determine a second identification of the object based on the determined confidence index values. Again, system 100 may conclude the identity, the second predicted identity, of an object based on the highest assigned confidence index value. And system 100 may further determine whether the second predicted identity and associated second identification confidence index is within the quality threshold described in step 620. In some aspects, if the modified image attribute and the associated second predicted identity and second identification confidence index are not within the quality threshold then system 100 may proceed to step 622 again and determine additional attributes for modification. Alternatively, rather than proceeding to step 622 again, system 100 may enter a "timeout" state after excessive delay in identifying an object within the quality threshold based on, for example, a determination that it performed a sufficient number of iterations, that it has spent more than a threshold amount of time processing an image without producing a valid identification, and so on. Upon determining that a "timeout" state has occurred, system 100 may cease processing and/or return a notification (e.g., to a mobile device) indicating that the object cannot be identified to sufficient accuracy.

Additional or alternatively, system 100 may determine the identity of an object based on changes in confidence index value distributions associated with the object (e.g., differences or similarities between distributions, an identified trend in the distributions, etc.) consistent with the disclosed embodiments. By way of nonlimiting example, system 100 may identify an object based on a determination that the highest confidence value in a plurality of distributions is associated with the same object (e.g., two distributions yield the same most-probable object result), with or without regard to any associated quality threshold (or threshold range), critical difference thresholds, and/or the confidence index values associated with other potential objects in the distribution. As another example, system 100 may identify an object based on a determination that one distribution differs from another in a particular way, if one distribution is similar to that of the other, etc. System 100 may also identify an object based on a statistical analysis of a plurality of such distributions (e.g., a certain number or ratio of distributions yield the same most-probable object result), etc.

When system 100 determines the identification confidence index, either the initial, second, third, etc., is within the quality threshold, or otherwise generates confident identification (e.g., based on an analysis of the differences/similarities among one or more confidence distributions as described herein), then system 100 proceeds to step 630. At step 630, system 100 presents the predicted identification associated with the identification confidence index within the quality threshold. Additionally, system 100 presents to the user the confidence of the predicted identification.

Figure 7:
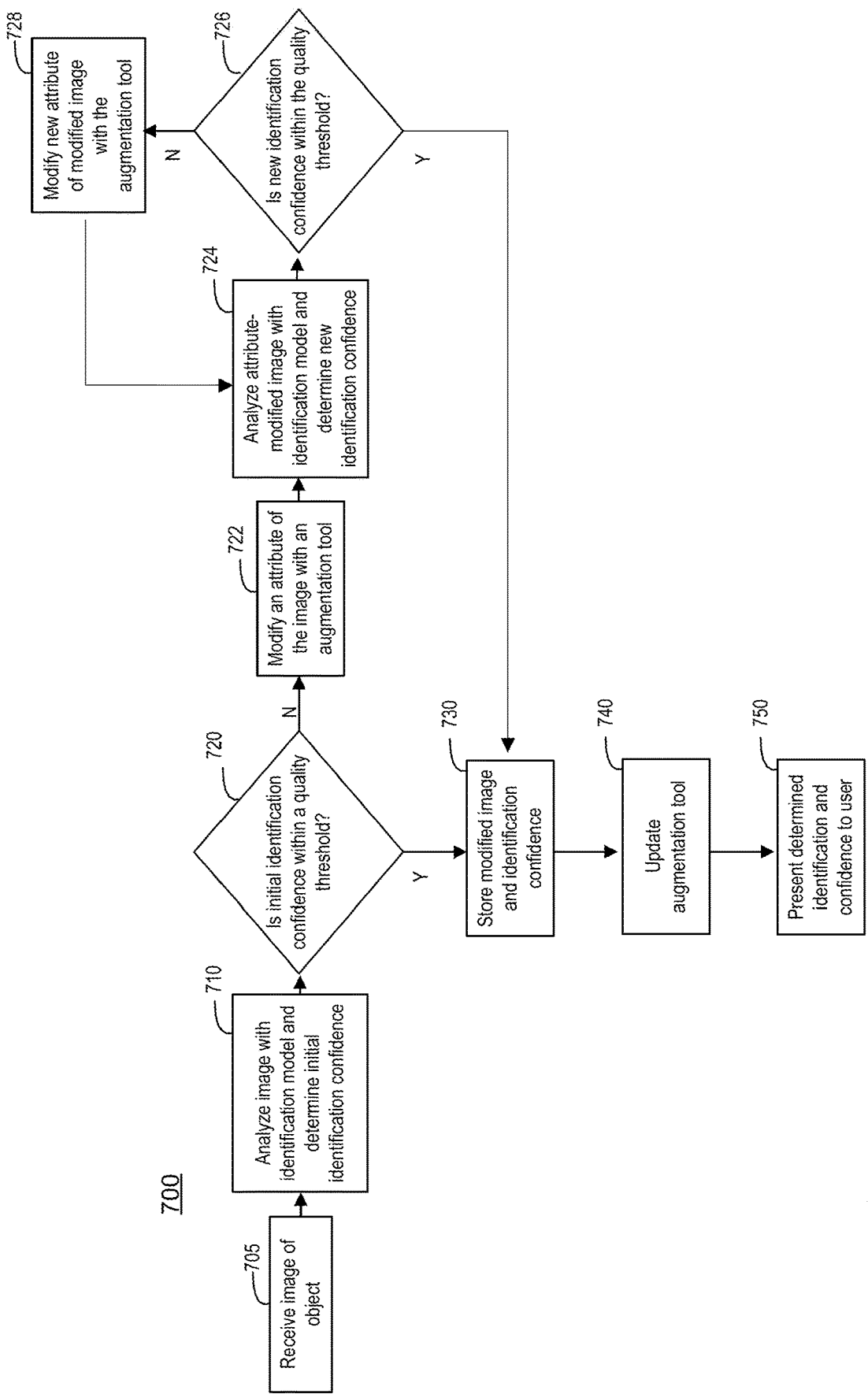
FIG. 7 is a flowchart of an exemplary method for modifying a preprocessing augmentation tool that enhances an identification model.

FIG. 7 is a flowchart of an exemplary method 700 for system 100 to modify a preprocessing tool enhancing an image identification model. At step 705, system 100 receives an image of objects for identification. As discussed herein, system 100 may receive this image from user device 110, and/or database 120, for example, via network 130. The received image may have associated image attributes discussed in FIG. 4 as well as non-image attribute data such as object attribute data discussed above. Further, the received image may have data associated with the device capturing the image (e.g., camera type, lens type, device location, etc.). The received image attribute data may be in the form of pixel data. The image may be high quality such that the user 112 understands the received image accurately represent objects for identification.

At step 710, system 100 analyzes the received image with an identification model. That is, system 100 may determine an initial identification confidence value, by recognizing features in received image portraying an object, and utilizing statistical analysis to determine an initial identification of the object through assignment of confidence index values. System 100 determines the identity, that is, the predicted identity, of an object based on any of the considerations described herein. For example, system 100 may identify an object based on the highest assigned confidence index value, a comparison of the highest assigned confidence index value to a predetermined or dynamically-changing quality threshold, a difference between the highest-assigned confidence index value and the second-highest assigned confidence index value, computed differences and/or similarities among a plurality of confidence distributions associated with an image, etc. The identification model may be any model discussed herein to identify objects in received images. In some embodiments, the identification model may be used to identify vehicles as discussed in FIG. 4. Additionally, the identification model may identify the object in the received image and determine an initial confidence in that identification in accordance with the modeling and statistical analysis described above.

At step 720, system 100 further determines whether the initial confidence of the predicted identity (i.e. first predicted identity) is within a predetermined quality threshold. For instance, system 100 may determine whether the first confidence of the first predicted identity is above the predetermined quality threshold by comparing the confidence index value for each potential identified object to the threshold. Alternatively, system 100 may determine whether the initial confidence of the predicted identity is within the quality threshold range by comparing the confidence index value of the associated first predicted identity to a range of predetermined quality threshold values. The predetermined quality threshold (or threshold range) may be set by user 112, by a third-party developer, and/or by system 100. User 112, the third-party developer, or system 100 may set the predetermined quality threshold based on analysis of the model prediction performance and historical confidence distribution data stored in a database such as database 120 or memory 314. As described above, the stored historical data may contain data specific to the particular user 112, specific to an associated user device 110, and/or data for a plurality of users and user devices. In some embodiments, the predetermined quality threshold may be used to conclude identification if the associated confidence index value of the first predicted identity is within the threshold (and proceed to step 730). Whereas, system 100, in some embodiments, may conclude an inaccurate identification or insufficient confident identification if the associated confidence index value of the first predicted identity is below the threshold (or outside the threshold range) (and proceed to step 722).

At step 722, when the first identification confidence is below the quality threshold, outside the threshold range, or system 100 otherwise determines that a given identification is insufficiently strong (e.g., based on an analysis of one or more confidence index value distributions as described elsewhere herein, system 100 may modify an attribute of the image with a preprocessing augmentation tool, e.g., preprocessing augmentation tool 319. System 100 may modify an attribute of the received image by means discussed in FIG. 4. In some embodiments, system 100 may modify the received image numerous times, or alternatively, system 100 may modify several attributes once or numerous times by means discussed.

Additionally or alternatively, in some embodiments, preprocessing augmentation tool 319 may select the attribute(s) for modification based on a model, random selection, or specific selection. Preprocessing augmentation tool 319 may include an optimizer model that selectively determines attribute(s) for modification based on confidence indexes and statistical distributions associated with historical analysis data stored in storage devices such as database 120 or memory 314 (i.e. historical modification data). Alternatively, in some embodiments, preprocessing augmentation tool 319 may include a machine-learning model that selectively determines attribute(s) for modification based on received historical modification data. Preprocessing augmentation tool 319 may include any other such modelling technique described herein to selectively determine received image attribute(s) for modification.

For instance, preprocessing augmentation tool 319 may further recognize effects on the identification confidences, or distribution of identification confidences, from historical modification data and associate the resulting identification confidence distributions with that given image attribute modification. As discussed herein, preprocessing augmentation tool 319 may recognize similar highest confidence value results in other distributions (e.g., historical distributions), similar distributions of confidence index values, similar critical difference thresholds, similar dynamically-changing quality thresholds, and/or other differences/similarities among a plurality of confidence distributions stored as historical modification data. Additionally or alternatively, for a given image, preprocessing augmentation tool 319 may determine one or more environmental cues associated with an image and make image attribute modifications accordingly as discussed above. For example, preprocessing augmentation tool 319 may recognize that the image was captured in a low-brightness (e.g. low-light) setting based solely on the resulting identification confidence distributions. Alternatively, for a given image, preprocessing augmentation tool 319 may recognize that the image was captured at a certain time of day (e.g. dusk or dawn) or under certain weather conditions which may affect the brightness of the image. Such environmental cues may be based on lighting (e.g., low-light, high-light), contrast, sharpness, color saturation, image location information (e.g., determined from an associated mobile device capturing the image), time of day, and the like. Addition or alternatively, such environmental cues may be based on input data from components 312 or sensors 318 described herein.

Such processing may be advantageous where user 112 only has access to the resulting identification confidence distributions but does not have access to the original identified images from associated historical modification data. As described herein, such modification data may be based on predetermined or dynamically-changing global data and/or on distributions associated with a particular user, device, time period, set of images, etc. For example, user 112 may be associated with the identification model designer (i.e. the model "backend") and the user 112 may only have access to historical modification data and the resulting identification confidence distributions, but may not have access to the original images taken by a different user such as a customer. In this example embodiment, preprocessing augmentation tool 319 may further use the historical modification data to further recognize effects in the identification confidences. Additionally or alternatively, user 112 may use the resulting identification confidence distributions to improve preprocessing augmentation tool 319 (and further improve the identification model version embedded on user device 110). In some embodiments, user 112 may use the resulting identification confidence distributions to improve the preprocessing augmentation tool 319, or user 112 may improve the quality threshold values. This modification data may also be based on one or more environmental cues discussed above. The identification model, in association with preprocessing augmentation tool 319, may further use historical dentification confidence distributions to recognize a low-quality image attribute, such as low-brightness, modify that image attribute, and recalculate the identification confidence after step 722. This low-light attribute may be recognized across several historical images, such that it may be further incorporated into preprocessing augmentation tool 319 by increasing brightness by 20% for all images prior and/or in conjunction with the identification model analysis.

Alternatively, in some embodiments, preprocessing augmentation tool 319 may, after analyzing historical inputs received from database 120 or user device 110, recognize that certain modifications significantly alter the identification confidence, as noted by a significant difference between stored initial identification confidences and new modified confidences associated with previous modifications. To make this determination, the preprocessing augmentation tool 319 may analyze data from historical inputs stored in database 120 or user device 110 collected from backend users 112 or customers 112, in any manner consistent with the disclosed embodiments. Preprocessing augmentation tool 319 may use this information to further dictate which image attributes are affected by respective attribute modification, and how significantly.

In some embodiments, preprocessing augmentation tool 319 may determine one or more attributes for modification in real-time, within a time window, or continuously. For instance, in some embodiments, preprocessing augmentation tool 319 may utilize several models described herein to determine the optimal attribute(s) for modification and the optimal analysis may improve or change over time. Preprocessing augmentation tool 319 may continuously process attribute options or it may determine attribute(s) for modification after a set time window.

After preprocessing augmentation tool 319 modifies one or more attributes of the received image in step 722, system 100 proceeds to step 724. At step 724, system 100 analyzes the modified image with the identification model and determines a second identification confidence value (or distribution values). Much like step 710, system 100 at step 724 may recognize features in the modified image portraying an object, and utilize statistical analysis to determine a second identification of the object through assignment of a second set of confidence index values. Again, system 100 may conclude the identity, i.e. the second predicted identity, of an object based on the highest assigned confidence index value of the second set. And system 100 may further determine whether the second predicted identity and associated second identification confidence index is within the quality threshold described in step 720. Alternatively, system 100 may conclude the identity of an object based on changes in confidence index value distributions, as described above (e.g., based on a difference between the highest and second-highest confidence index values in a distribution, a similarity or change between the confidence index value distribution and one or more other confidence distributions, etc.).

At step 726, system 100 may further determine whether the new identification, i.e. second predicted identity and associated second identification confidence index, is within the quality threshold described in step 720. If the second identification confidence index is within the quality threshold then system 100 may proceed to step 730. Whereas, if it is not, system 100 may proceed to step 728.

At step 728, like step 722, system 100 will determine a new group of one or more attributes for modification with preprocessing augmentation tool 319. Alternatively, in some embodiments, system 100 may determine that the attribute modified in step 722 should be modified again (e.g., modifying the rotation from 10° to 45°, modifying the color from blue to green, etc.) based on the analysis techniques and preprocessing augmentation tool 319 described herein. And system 100 may proceed again to step 724 to analyze the newly modified image and determine a third predicted identification and a third identification confidence index. It will be understood by one skilled in the art that system 100 may repeat steps 724, 726 and 728 until an identification confidence index is within the quality threshold. Or alternatively, in some embodiments, system 100 may repeat steps 724, 726, and 728 for a set period of time and proceed with step 730. In some embodiments, rather than repeating steps 724, 726, and 728, system 100 may enter a "timeout" state after excessive delay in identifying an object within the quality threshold as described above, such as by determining that it has performed a sufficient number of iterations, spent more than a threshold amount of time trying to identify an object, etc. In these embodiments, system 100 may perform additional processes as described above (e.g., ceasing processing, providing a notification via a mobile device that the object cannot be sufficiently identified, etc.).

When system 100 determines the identification confidence index, either the initial (from step 720), or second, third, etc. (from step 726), is within the quality threshold, then system 100 proceeds to step 730. Alternatively, system 100 may proceed to step 730 with a "timeout" determination as described above. At step 730, system 100 may store the initial image, and/or modified images from steps 722 and 728 in a storage media such as database 120 or memory 314. Additionally, system 100 may further store the identification confidence indexes associated with the modified images. In some embodiments these stored images and confidence indexes may be included in the set of historical data described above.

At step 740, system 100 updates preprocessing augmentation tool 319 with the resulting image analysis from steps 710 and 724, the quality threshold comparison from steps 720 and 726, and the modifications from steps 722 and 728. In some embodiments, system 100 may update preprocessing augmentation tool 319 with the stored identification confidence indexes and attribute modified images from step 730.

At step 750, system 100 presents the predicted identification associated with the identification confidence index within the quality threshold from step 720 or step 726. Additionally, system 100 presents to the user the confidence of the predicted identification.

Embodiments of the present disclosure may be implemented with computer executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

Computer programs based on the written description and methods of this specification are within the skill of a software developer. The various programs or program modules can be created using a variety of programming techniques. For example, program sections or program modules can be designed by means of JavaScript, Scala, python, Java, C, C++, assembly language, or any such programming languages, as well as data encoding languages (such as XML, JSON, etc.), query languages (such as SQL), presentation-related languages (such as HTML, CSS etc.) and data transformation language (such as XSL). One or more of such software sections or modules can be integrated into a computer system, non-transitory computer readable media, or existing communications software.

The words "comprising," "having," "containing," and "including," and other similar forms are intended to be equivalent in meaning and be interpreted as open ended, in that, an item or items following any one of these words is not meant to be an exhaustive listing of such item or items, or meant to be limited to only the listed item or items. In addition, the singular forms "a," "an," and "the" are intended to include plural references, unless the context clearly dictates otherwise.

Having described aspects of the embodiments in detail, it will be apparent that modifications and variations are possible without departing from the scope of aspects of the invention as defined in the appended claims. As various changes could be made in the above constructions, products, and methods without departing from the scope of aspects of the invention, it is indented that all matter contained in the above description and shown in the accompanying drawings shall be interpreted as illustrative and not in a limiting sense.

What is claimed is:

1. A system for modifying an identification model, comprising:
    one or more memory devices storing instructions; and
    one or more processors configured to execute the instructions to perform operations comprising:
        receiving a first set of data associated with a set of images depicting a vehicle;
        updating, based on the received set of data, an augmentation tool configured to dynamically select from a plurality of processing techniques;
        augmenting the received first set of data based on the selected processing technique;
        receiving a second set of data comprising statistical data associated with the augmented data;
        determining a vehicle identification confidence value based on the second set of data by applying a vehicle identification model comprising at least one of a neural network model, a regression model, a statistical model, a parametric model, a non-parametric model, or a semi-parametric model;
        storing the received first set of data, the selected processing technique, the received second set of data, and the determined vehicle identification confidence value; and
        modify the augmentation tool based on the stored data.

2. The system of claim 1, wherein the processing techniques comprise modifying a subset of the first set of data by modifying data for at least one of a rotation, a focus, a contrast, or a color.

3. The system of claim 2, wherein augmenting the first set of data is based on a plurality of selected processing techniques.

4. The system of claim 1, wherein the operations further comprise sending at least one of the stored received first set of data, the selected processing technique, the received second set of data, or the determined vehicle identification confidence value to a storage device.

5. The system of claim 4, wherein the operations further comprise:
    receiving a third set of data of augmentation tool updates; and
    updating the augmentation tool based on the received third set of data.

6. The system of claim 5, wherein the third set of data comprises at least one of processed statistical data, processed technique data, and or determined vehicle identification confidence data.

7. A device for modifying an identification model, comprising:
    one or more memory devices storing instructions; and
    one or more processors configured to execute the instructions to perform operations comprising:
        receiving a first set of data associated with a set of images depicting a vehicle;
        updating, based on the received set of data, an augmentation tool configured to dynamically select from a plurality of processing techniques;
        augmenting the first set of data based on the selected processing technique;
        receiving a second set of data comprising statistical data associated with the augmented data;
        determining a vehicle identification confidence value based on the received second set of data, by applying a vehicle identification model comprising at least one of a neural network model, a regression model, a statistical model, a parametric model, a non-parametric model, or a semi-parametric model;
        storing the received first set of data, the selected processing technique, the received second set of data, and the determined vehicle identification confidence value; and
        modifying the augmentation tool based on the stored data.

8. The device of claim 7, wherein the processing techniques comprise modifying a subset of the first set of data by modifying data for at least one of a rotation, a focus, a contrast, or a color.

9. The device of claim 8, wherein augmenting the first set of data is based on a plurality of selected processing techniques.

10. The device of claim 7, wherein the operations further comprise sending at least one of the stored received first set of data, the selected processing technique, the received second set of data, or the determined vehicle identification confidence value to a storage device.

11. The device of claim 10, wherein the operations further comprise:
    receiving a third set of data of augmentation tool updates; and
    updating the augmentation tool based on the received third set of data.

12. The device of claim 11, wherein the third set of data comprises at least one of processed statistical data, processed technique data, or determined vehicle identification confidence data.

13. A method for modifying an identification model, comprising:
    receiving a first set of data associated with a set of images depicting a vehicle;

updating, based on the received set of data, an augmentation tool configured to dynamically select from a plurality of processing techniques;

augmenting the first set of data based on the selected processing technique;

receiving a second set of data comprising statistical data associated with the augmented data;

determining a vehicle identification confidence value based on the received second set of data by applying a vehicle identification model comprising at least one of a neural network model, a regression model, a statistical model, a parametric model, a non-parametric model, or a semi-parametric model;

storing the received first set of data, the selected processing technique, the received second set of data, and the determined vehicle identification confidence value; and modify the augmentation tool based on the stored data.

14. The method of claim 13, wherein the processing techniques comprise modifying a subset of the first set of data by modifying data for at least one of a rotation, a focus, a contrast, or a color.

15. The method of claim 13, further comprising sending at least one of the stored received first set of data, the selected processing technique, the received second set of data, or the determined vehicle identification confidence value to a storage device.

16. The method of claim 15, further comprising:
receiving a third set of data of augmentation tool updates; and
updating the augmentation tool based on the received third set of data.

17. The method of claim 16, wherein the third set of data comprises at least one of processed statistical data, processed technique data, or determined vehicle identification confidence data.

* * * * *